United States Patent
Bilik et al.

(10) Patent No.: US 10,421,452 B2
(45) Date of Patent: Sep. 24, 2019

(54) SOFT TRACK MAINTENANCE

(71) Applicant: GM GLOBAL TECHNOLOGY OPERATIONS LLC, Detroit, MI (US)

(72) Inventors: Igal Bilik, Rehovot (IL); Shahar Villeval, Tel Aviv (IL); Ishai Eljarat, Jerusalem (IL); Gonen Barkan, Lehavim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/450,556

(22) Filed: Mar. 6, 2017

(65) Prior Publication Data

US 2018/0251125 A1    Sep. 6, 2018

(51) Int. Cl.
 *B60W 30/09* (2012.01)
 *G01C 21/34* (2006.01)
 (Continued)

(52) U.S. Cl.
 CPC ............ *B60W 30/09* (2013.01); *B60W 10/04* (2013.01); *B60W 10/20* (2013.01); *B60W 50/14* (2013.01);
 (Continued)

(58) Field of Classification Search
 CPC ......... H04L 1/002; H04L 1/00; H04L 1/0015; H04L 1/0019; H04L 1/0021; G11B 20/10379; B60W 30/08; B60W 30/09; G08G 1/16; G08G 1/161; G08G 1/162; G08G 1/163; G08G 1/164; G08G 1/165; G08G 1/166; G08G 1/207; G05B 2219/42338; G05B 2219/42342; G05B 23/0254; G05B 2219/33043; G05B 2219/37331; G05B 2219/41146; G05B 2219/41385; G05B 2219/39219; G05B 2219/39243; G01S 13/06; G01S 5/0294;
 (Continued)

(56) References Cited

U.S. PATENT DOCUMENTS

| 6,064,942 A * | 5/2000 | Johnson ............... F41G 3/02 342/118 |
| 6,292,752 B1 * | 9/2001 | Franke ............... G01S 13/931 340/435 |

(Continued)

OTHER PUBLICATIONS

Watanabe et al., "Vision-Based Obstacle Avoidance for UAVs," Aug. 2007, AIAA.*

(Continued)

*Primary Examiner* — Thomas G Black
*Assistant Examiner* — Sara J Lewandroski
(74) *Attorney, Agent, or Firm* — Cantor Colburn LLP

(57) ABSTRACT

A vehicle, system and method of driving the vehicle. A radar system obtains a measured location of an object in an environment of the vehicle. A processor predicts a location of the object, determines a distance between the predicted location of the object and the measured location of the object, determines a confidence level for the predicted location the object based on the determined distance, selects a tracking state for the object based on the confidence level, and drives the vehicle to avoid the object according to the tracking state of the object. The processor and radar system may be onboard the vehicle.

15 Claims, 4 Drawing Sheets

(51) Int. Cl.
*B60W 50/14* (2012.01)
*G08G 1/16* (2006.01)
*B60W 10/20* (2006.01)
*B60W 10/04* (2006.01)

(52) U.S. Cl.
CPC .......... *G01C 21/34* (2013.01); *G01C 21/3415* (2013.01); *G08G 1/165* (2013.01); *G08G 1/166* (2013.01); *B60W 2050/143* (2013.01); *B60W 2420/52* (2013.01); *B60W 2710/20* (2013.01); *B60W 2720/10* (2013.01)

(58) Field of Classification Search
CPC .......... G01S 3/325; G01S 13/66; G01S 13/72; G01S 13/723; G01S 13/726; G01S 13/86; G01S 2205/002
USPC .................................................. 701/536, 480
See application file for complete search history.

(56) References Cited

U.S. PATENT DOCUMENTS

| | | | | |
|---|---|---|---|---|
| 7,187,320 | B1* | 3/2007 | Yang | G01S 13/723 342/104 |
| 7,228,230 | B2* | 6/2007 | Hirokawa | G01C 21/165 342/357.31 |
| 7,460,951 | B2* | 12/2008 | Altan | G01S 13/726 340/903 |
| 9,097,800 | B1* | 8/2015 | Zhu | G01S 13/865 |
| 9,606,962 | B2* | 3/2017 | Weyn | G01S 5/0252 |
| 2002/0171586 | A1* | 11/2002 | Martorana | G01S 5/021 342/458 |
| 2002/0188386 | A1* | 12/2002 | Day | G01S 13/86 701/4 |
| 2004/0027274 | A1* | 2/2004 | Driessen | G01S 7/2923 342/91 |
| 2005/0131635 | A1* | 6/2005 | Myllymaki | G01S 5/02 701/435 |
| 2009/0292468 | A1* | 11/2009 | Wu | G01S 13/726 701/301 |
| 2010/0191391 | A1* | 7/2010 | Zeng | G01S 13/723 701/1 |
| 2011/0208496 | A1* | 8/2011 | Bando | G01S 19/49 703/2 |
| 2012/0022739 | A1* | 1/2012 | Zeng | B60W 30/12 701/536 |
| 2012/0223853 | A1* | 9/2012 | Shiba | G01S 13/726 342/90 |
| 2013/0093617 | A1* | 4/2013 | Christopher | G01S 7/2923 342/146 |
| 2014/0236477 | A1* | 8/2014 | Chen | G01S 13/867 701/450 |
| 2014/0281779 | A1* | 9/2014 | Wellman | G06F 11/0706 714/746 |
| 2015/0332114 | A1* | 11/2015 | Springer | G06K 9/4604 348/148 |
| 2016/0054430 | A1* | 2/2016 | Paluszek | G01S 5/0294 702/150 |
| 2016/0304028 | A1* | 10/2016 | Hathaway | B60Q 9/008 |
| 2016/0349362 | A1* | 12/2016 | Rohr | G01S 13/86 |
| 2017/0210379 | A1* | 7/2017 | Obata | B60W 30/0956 |
| 2017/0242095 | A1* | 8/2017 | Schuh | B60W 30/16 |
| 2017/0294124 | A1* | 10/2017 | Baba | G06K 9/00805 |
| 2018/0126984 | A1* | 5/2018 | Liu | B60W 10/04 |
| 2018/0203445 | A1* | 7/2018 | Micks | G06F 17/5095 |

OTHER PUBLICATIONS

Yoo et al., "PC-Based Implement of the Maritime Radar Display Unit," 1997, IEEE.*
Penoyer, "The Alpha-Beta Filter," 1993, http://collaboration.cmc.ec.gc.ca/science/rpn/biblio/ddj/Website/articles/CUJ/1993/9307/penoyer/penoyer.htm.*
Watanabe et al., Vision-Based Obstacle Avoidance for UAVs, Aug. 2007, AIAA (Year: 2007).*
Yoo et al., "PC-Based Implement of the Maritime Radar Display Unit," 1997, IEEE (Year: 1997).*

* cited by examiner

SOFT TRACK MAINTENANCE

The subject disclosure relates to a system and method for providing a track on a target with respect to a vehicle and in particular to activating and deactivating the track based on an estimated confidence level for the track.

Vehicles are increasingly including driver-assist technology to provide for safer driving as well as in anticipation of autonomous or "driverless" vehicles. Such technology requires the ability to locate and track an object or target, such as another vehicle or a pedestrian, with respect to the vehicle. Since there are often many targets in the environment of the vehicle, there is a need to track many targets as well as to prioritize which targets require tracking.

Track maintenance defines when to start or end the life of a track and under which conditions the track should be activated or deactivated. One method of track maintenance records whether a predicted location of the object hits or misses a measured or actual location of the object over a plurality of time steps, activates tracking when a sufficient number of hits are recorded and deactivates tracking when a sufficient number of misses is recorded. This tracking method does not account for a level of confidence in the predicted location or how close a predicted location comes to a measured location. Accordingly, it is desirable to provide a method of activating and/or deactivating a track based on a confidence level that can be attributed to a relative distance between predicted location and measured location.

SUMMARY

In one exemplary embodiment, a method of driving a vehicle is disclosed. The method includes determining a distance between a predicted location of an object in an environment of the vehicle at a selected time and a measured location of the object at the selected time, determining a confidence level for the predicted location the object based on the determined distance, selecting a tracking state for the object based on the confidence level, and driving the vehicle to avoid the object according to the tracking state of the object.

A route may be estimated for the vehicle based on a selected track of the object the vehicle may drive along the estimated route. The location of the object at the selected time may be predicted using a previous state of the object. Determining the confidence level may include defining a region around the predicted location, defining a confidence function as a function of distance in the region and determining the confidence level corresponding to the determined distance as indicated by the confidence function. In various embodiments, the confidence function decreases with distance from the predicted location as one of: a linear function, a hyperbolic function, and an exponential function. The confidence function may be at a maximum at the prediction location and falls to zero at a boundary of the region. Tracking of the object may be activated when the confidence level rises above an activation threshold and tracking of the object may be deactivated when the confidence level falls below a deactivation threshold.

In another exemplary embodiment, a system for driving a vehicle is disclosed. The system includes a radar system for obtaining a measured location of an object in an environment of the vehicle, and a processor. The processor is configured to predict a location of the object, determine a distance between the predicted location of the object and the measured location of the object, determine a confidence level for the predicted location the object based on the determined distance, select a tracking state for the object based on the confidence level, and drive the vehicle to avoid the object according to the tracking state of the object.

The system may include a collision-avoidance system that determines a route for the vehicle that avoids the object based on a selected tracking of the object and drives the vehicle along the estimated route. The processor may predict the location of the object at the selected time using a previous state of the object. The processor may determine the confidence level by defining a region around the predicted location, defining a confidence function as a function of distance in the region and determining the confidence level corresponding to the determined distance as indicated by the confidence function. In various embodiments, the confidence function varies with distance from the predicted location as one of a linear function, a hyperbolic function, and an exponential function. The confidence function may be at a maximum at the prediction location and falls to zero at a boundary of the region. The processor may activate the tracking of the object when the confidence level rises above an activation threshold and deactivate the tracking of the object when the confidence level falls below a deactivation threshold.

In yet another exemplary embodiment, a vehicle is disclosed. The vehicle includes a radar system for obtaining a measured located of an object in an environment of the vehicle, and a processor. The processor is configured to predict a location of the object, determine a distance between the predicted location of the object and the measured location of the object, determine a confidence level for the predicted location the object based on the determined distance, select a tracking state for the object based on the confidence level, and drive the vehicle to avoid the object according to the tracking state of the object.

The vehicle may include a collision-avoidance system that determines a route for the vehicle that avoids of the object based on a selected tracking of the object and drives the vehicle along the estimated route. The processor may predict the location of the object based on a previous state of the object. The processor may determine the confidence level by defining a region around the predicted location, defining a confidence function as a function of distance in the region and determining the confidence level corresponding to the determined distance as indicated by the confidence function. In various embodiments, the confidence function decreases with distance from the predicted location by one of a linear function, a hyperbolic function, and an exponential function. The processor may activate the tracking of the object when the confidence level rises above an activation threshold and deactivate the tracking of the object when the confidence level falls below a deactivation threshold.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
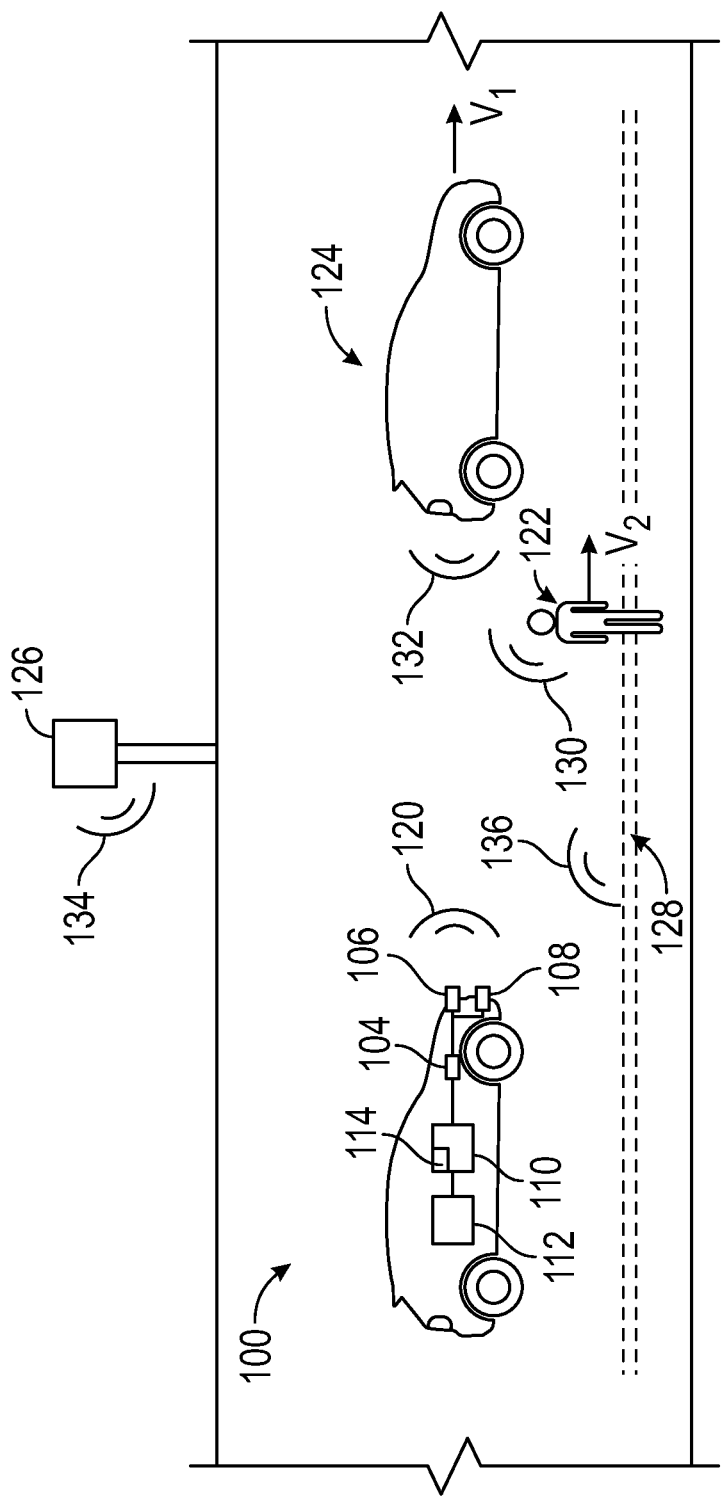
FIG. 1 shows a vehicle, such as an automobile, that includes an autonomous driving system that drives the vehicle with respect to various objects in an environment of the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, FIG. 1 shows a vehicle 100, such as an automobile, that includes an autonomous driving system 102 that drives the vehicle 100 with respect to various objects in the environment thereof. The autonomous driving system 102 includes a radar system 104 suitable for providing radio frequency signals that can be used to determine a distance and/or a relative velocity of various objects with respect to the vehicle 100. In the embodiment shown in FIG. 1, the radar system 104 includes a transmitter 106 and a receiver 108. In alternate embodiments, the radar system 104 may be a MIMO (multi-input, multi-output) radar system that includes an array of transmitters and an array of receivers. The radar system 104 controls and operates the transmitter 106 to generate a radio frequency wave front (a "source signal" 120). In one embodiment, the source signal 120 includes a linear frequency-modulated continuous wave (LFM-CW), often referred to as a chirp signal. Alternately, the source signal 120 can be a pulsed signal or a combination of pulsed and chirp signals. The source signal 120 is reflected off of various objects in the environment of the vehicle 100. Exemplary objects shown in FIG. 1 include, but are not limited to, pedestrian 122, vehicle 124, light post 126 and curb 128. Some of these objects (e.g., light post 126 and curb 128) are motionless in their environment, while other objects (e.g., pedestrian 122 and vehicle 124) are in motion with respect to their environment. Motion of the vehicle 124 is indicated by vector $v_1$ and motion of the pedestrian 122 is indicted by vector $v_2$. Each of these objects generates a reflected signal in response to receiving the source signal 122. Pedestrian 122 generates reflected signal 130. Vehicle 124 generates reflected signal 132. Light post 126 generates reflected signal 134. Curb 128 generates reflected signal 136. The echo signals are received at the receiver 108 of the radar system 104, which generally includes circuitry for sampling the echo signals 130, 132, 134, 136. Echo signals 130, 132, 134, 136 are provided from the radar system 104 to a control unit 110 which includes a processor 114 that performs the methods disclosed herein for tracking at least one of the objects as well as for activating and deactivating a track of the at least one object.

The control unit 110 activates a track for an object and provides the track to the collision-avoidance system 112. The collision-avoidance system 112 controls steering and acceleration/deceleration components to perform suitable maneuvers at the vehicle 100 to avoid the object. By tracking the object, the vehicle 100 can, for example, maneuver by accelerating or decelerating the vehicle 100 or steering the vehicle in order to avoid the object. Alternatively, the control unit 110 can provide a signal to alert a driver of the vehicle 100 so that the driver can take any suitable action to avoid the object.

In order to provide a track for an object to the collision-avoidance system 112, the control unit 110 determines or selects a tracking state for the object. The control unit 110 predicts a location for an object to be in at a given time and then receives a measurement of the actual location of the object at the given time from the radar system 104. A distance is determined between the measured location and the predicted location. The distance is used to obtain a value that represents a confidence level for the predicted location. The confidence level is a function of distance and generally decreases as the distance between the predicted location and the measured location increases. The confidence level can be compared to various threshold values in order to either activate the tracking of an object or deactivate the tracking of the object. Active tracks are provided to the collision-avoidance system 112.

Figure 2:
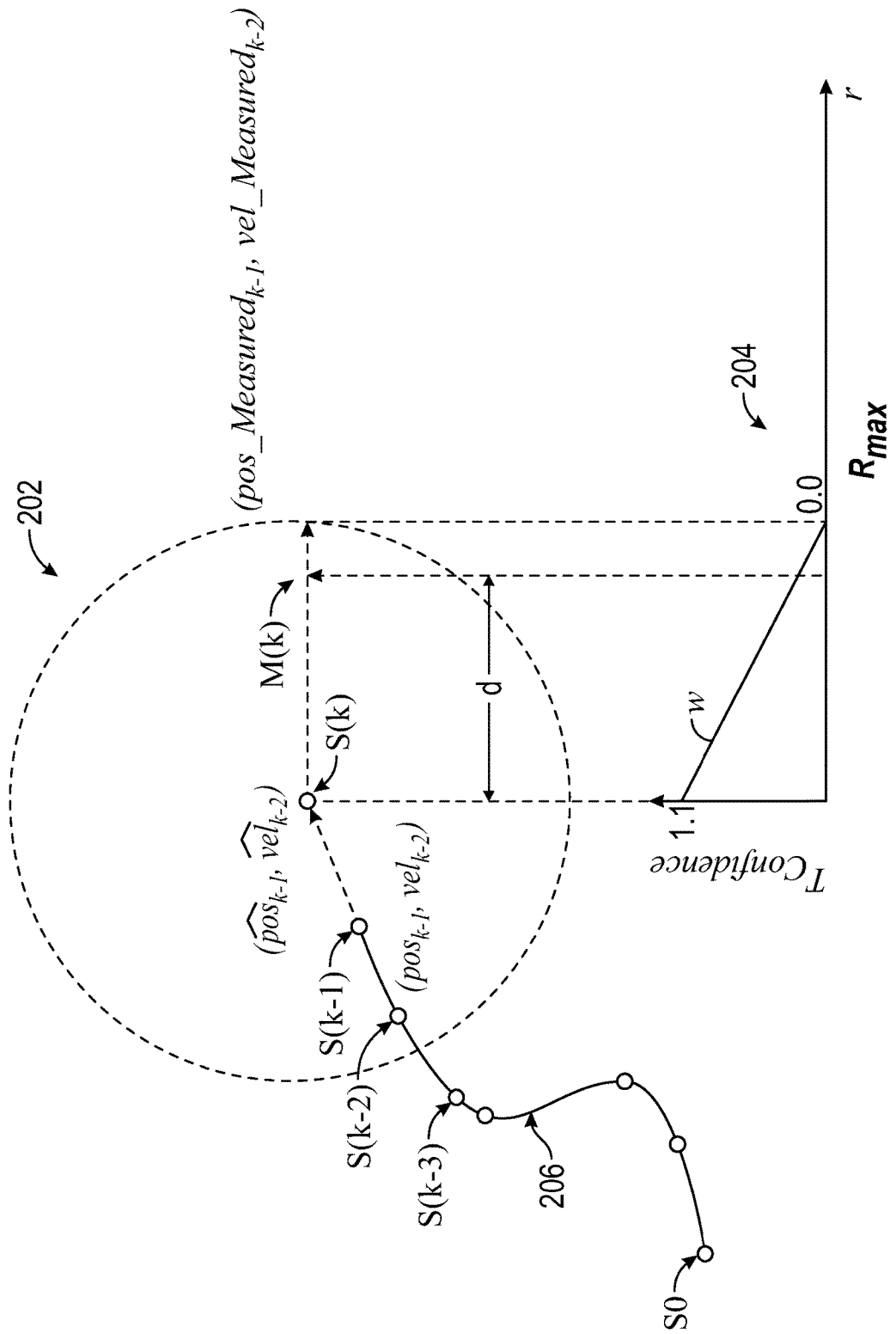
FIG. 2 shows a diagram illustrating a method for determining a confidence level for of an object in one embodiment.

FIG. 2 shows a diagram 200 illustrating a method for determining a confidence level for of an object in one embodiment. The diagram 200 includes a tracking map 202 and a confidence function 204. The tracking map 202 shows a track 206 of the object. The track 206 connects various states $S_0, \ldots, S(k-3), S(k-2), S(k-1)$ of the object at different time steps $(0, \ldots, k-1)$. Each state is represented by its state variables, which includes position and velocity vectors of the object. For example, state $S(k-1)$ is represented by its position vector $\widehat{pos}_{k-1}$ and its velocity vector $\widehat{vel}_{k-1}$.

The tracking map 202 further illustrates a predicted state $S(k)$ and a measured state $M(k)$ at time step k. Predicted state $S(k)$ is represented by position vector $\widehat{pos}_k$ and velocity vector $\widehat{vel}_k$. The measured state $M(k)$ is represented by position vector $\widehat{pos}_{measured}$ and velocity vector $\widehat{vel}_{measured}$. The state variables for the state $S(k-1)$ at time step k−1 can be used to predict state $S(k)$ of the object for time step k. At the time step k, the radar system (104, FIG. 1) obtains a measured state $M(k)$ of the object.

Once the predicted state $S(k)$ and the measured state $M(k)$ are obtained, the distance between $S(k)$ and $M(k)$ can be determined from their position vectors. The distance is determined between the predicted location of the object and the measured location of the object, i.e., distance $d = \|\widehat{pos}_k, \widehat{pos}_{measured}\|$. A confidence level for the predicted state $S(k)$ is determined based on the distance d between the predicted state $S(k)$ and measured state $M(k)$. In particular, the determined distance d is input into a confidence function w to obtain a confidence level for the predicated state $S(k)$ of the object, as shown in Eq. (1):

$$T_{confidence} = w(d) \qquad \text{Eq. (1)}$$

The confidence function w is a function defined with respect to the predicted location. An exemplary confidence function 204 is shown in FIG. 2. In one embodiment, once the location of the object is predicted, a region is defined around the predicted location, wherein the region is a spherical region having a radius $R_{max}$. The confidence function w can be a linear function or can be a hyperbolic function, a power function, an exponential function, etc., defined within this region. The confidence function has a maximal value, generally equal to 1 at the predicted location of the object and decreases with distance away from the predicted location. In various embodiments, the confidence function falls to zero at the radius $R_{max}$ of the defined region.

The illustrative confidence function of FIG. 2 has a value of one at the predicted location and falls linearly to zero at distance $R_{max}$ from the predicted location.

Figure 3:
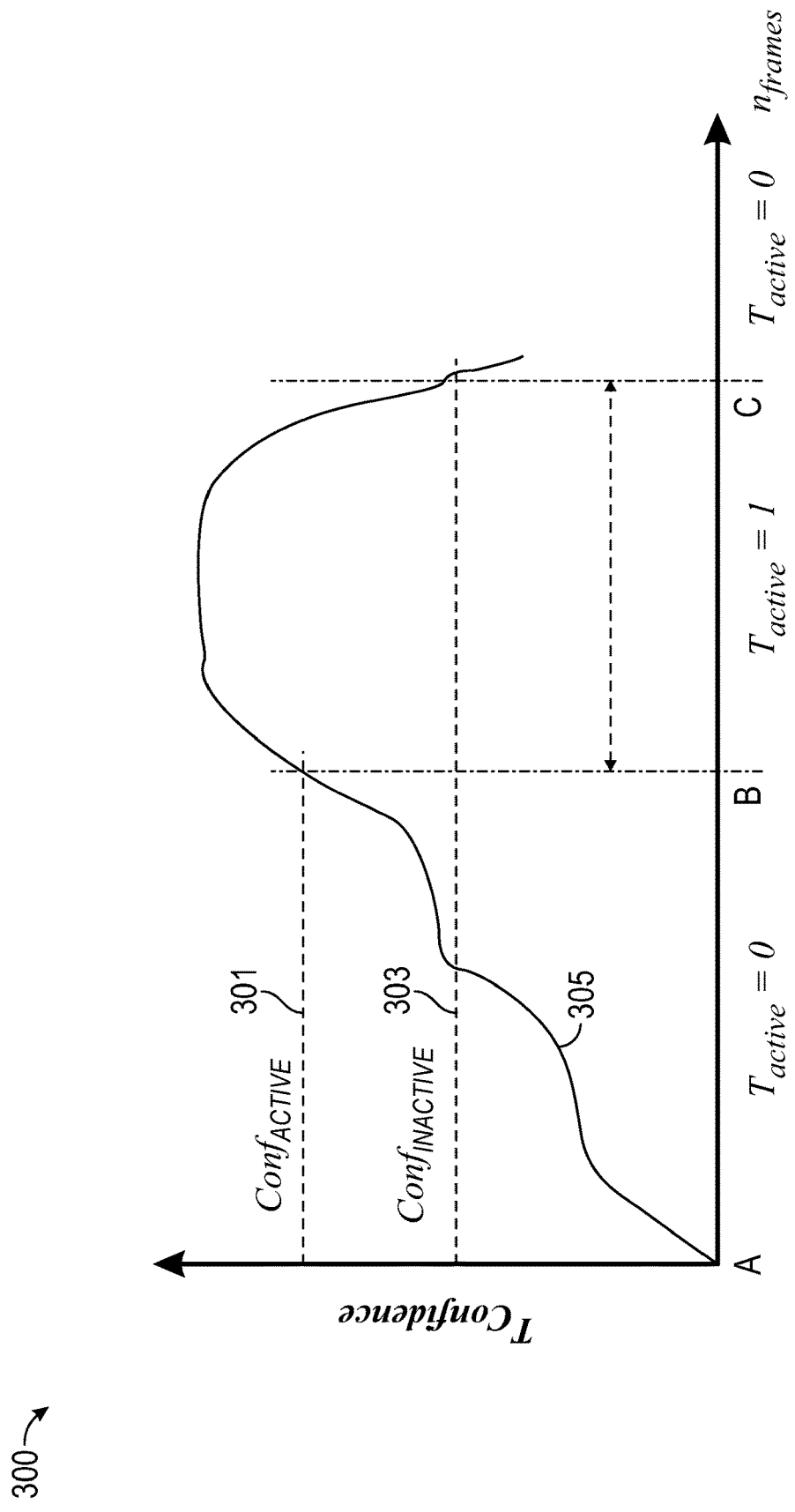
FIG. 3 illustrates a process for deciding whether to track an object based on the confidence level.

FIG. 3 illustrates a process for deciding whether to track an object based on the confidence level 305. A graph 300 shows a time evolution of a confidence level for an illustrative track. Confidence (Conf) is shown along the ordinate. Time is shown along the abscissa. Two thresholds are shown along the ordinate axis for illustrative purposes. The first threshold is an activation threshold (Conf$_{active}$) 301. The second threshold is a deactivation threshold (Conf$_{inactive}$) 303. The deactivation threshold 303 is lower than the activation threshold 301, i.e., Conf$_{active}$>Conf$_{inactive}$. When the confidence level 305 for an object rises from below the activation threshold 301 to above the activation threshold 301, the control unit 110 activates a track for the object. When the confidence level 305 for the object drops from above the deactivation threshold 303 to below the deactivation threshold 303, the control unit 110 deactivates the track on the object.

As shown in FIG. 3, the confidence level 305 rises during the time interval between time A and time B, during which time the processor is not tracking the object, i.e., T$_{active}$=0. At time B, the confidence level 305 rises above the activation threshold 301 (i.e., Conf>Conf$_{active}$), thereby activating a tracking program at the control unit 110 in order to track the object. During the time interval between time B and time C, the confidence level 305 remains above the deactivation threshold 303, and thus the processor continues tracking of the object, i.e., T$_{active}$=1. At point C, the confidence level 305 drops below the deactivation threshold 303 (i.e., Conf<Conf$_{inactive}$), thereby causing the processor to deactivate tracking of the object, i.e., T$_{active}$=0.

Figure 4:
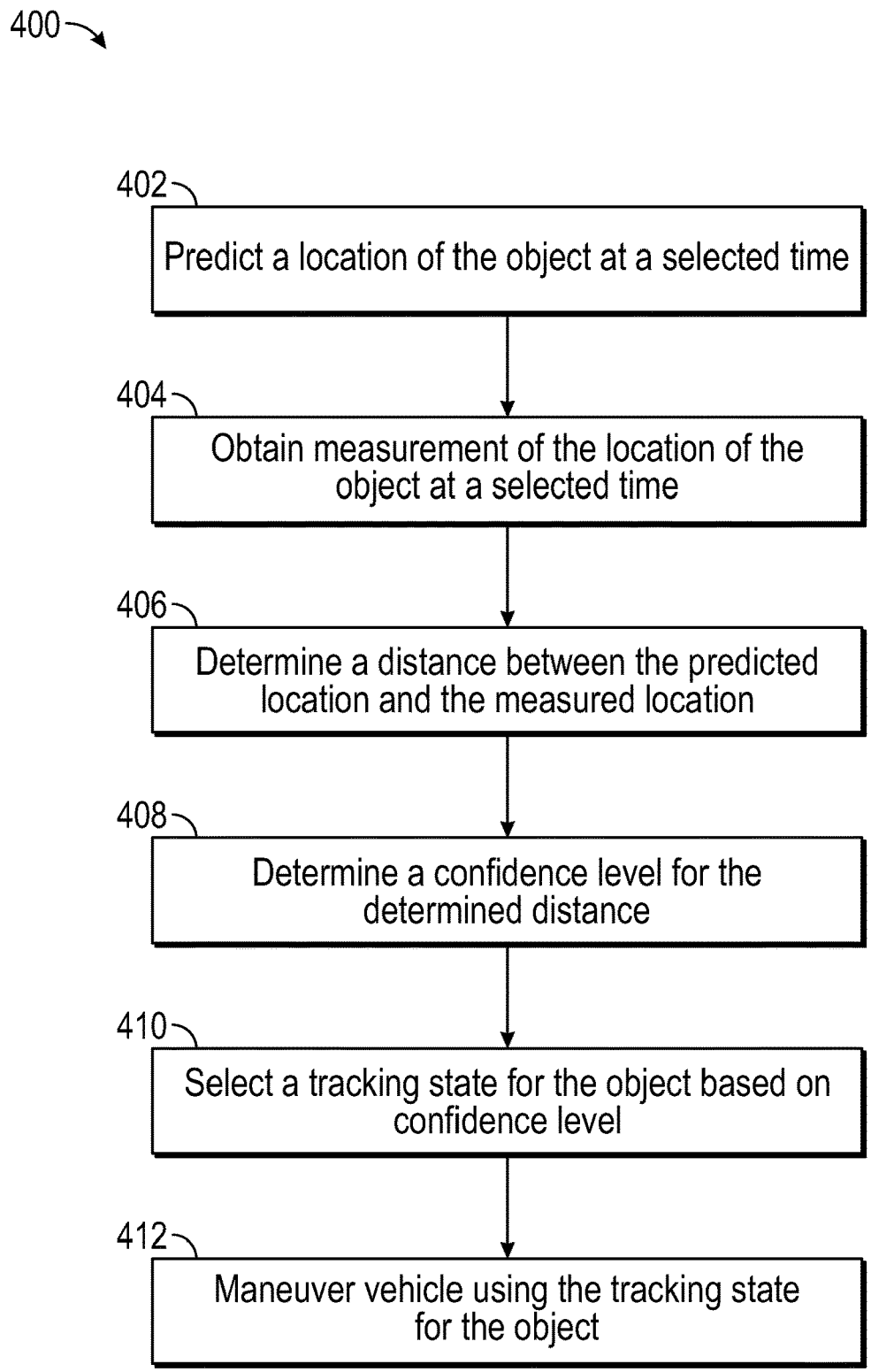
FIG. 4 shows a flowchart illustrating a method of driving a vehicle with respect to an object or in order to avoid collision with the object, in an embodiment.

FIG. 4 shows a flowchart 400 illustrating a method of driving a vehicle with respect to an object or in order to avoid interference with the object, in an embodiment. In Box 402, a location of the object is predicted for a selected time. In box 404, a measured location is obtained for the object at the selected time. In box 406, a distance is determined between the predicted location and the measured location. In box 408, a confidence level is determined for the determined distance and in box 410, the confidence level is used to determine a tracking state for the object. In box 412, the vehicle is maneuvered with respect to the object (such as to avoid the object) based on the tracking of the object.

The tracking method disclosed herein therefore takes into account a confidence level associated with a distance between a predicted location predicted and a measured location in order to select an object for tracking. As a result, the control unit 110 does not maintain a track on an object that has a low confidence associated with it. The method disclosed herein therefore reduces the number of tracked objects and thus reduces a number of computations at the processor used for tracking objects.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of driving a vehicle, comprising:
   determining, at a processor, predicted locations of an object in an environment of the vehicle at a plurality of times;
   obtaining, at a radar system, measured locations of the object at the plurality of times;
   obtaining a time evolution of a confidence level for the predicted locations, the confidence level at a selected time being determined from a distance between the predicted location of the object in an environment of the vehicle at the selected time and the measured location of the object at the selected time, wherein determining the confidence level includes defining a region around the predicted location, defining a confidence function as a function of distance in the region and determining the confidence level corresponding to the determined distance as indicated by the confidence function, wherein the confidence function is at a maximum at the predicted location and falls to zero at a boundary of the region;
   activating a track of the object at a time at which the confidence level rises above an activation threshold;
   sending the activated track to a collision-avoidance system; and
   controlling the vehicle using the collision-avoidance system to avoid the object based on the track.

2. The method of claim 1, further comprising determining a route for the vehicle based on the track of the object and driving the vehicle along the determined route.

3. The method of claim 1, further comprising predicting the location of the object at the selected time using a previous state of the object.

4. The method of claim 1, further comprising deactivating the track of the object when the confidence level falls below a deactivation threshold.

5. The method of claim 1, wherein the confidence function decreases with distance from the predicted location as one of: (i) a linear function; (ii) a hyperbolic function; and (iii) an exponential function.

6. A system for driving a vehicle, comprising:
   a radar system for obtaining measured locations of an object in an environment of the vehicle at a plurality of times; and
   a processor configured to:
      determine predicted locations of an object in an environment of the vehicle at the plurality of times;
      obtain a time evolution of a confidence level for the predicted locations, the confidence level at a selected time being determined from a distance between the predicted location of the object in an environment of the vehicle at the selected time and the measured location of the object at the selected time;
      activate a track of the object at a time at which the confidence level rises above an activation threshold,
      send the activated track to a collision-avoidance system; and
      control the vehicle using the collision-avoidance system to avoid the object based on the track,
      wherein the processor determines the confidence level by defining a region around the predicted location, defining a confidence function as a function of distance in the region and determining the confidence level corresponding to the determined distance as indicated by the confidence function, the confidence function being at a maximum at the predicted location and falling to zero at a boundary of the region.

7. The system of claim 6, wherein the processor deactivates the track of the object when the confidence level falls below a deactivation threshold.

8. The system of claim 6, wherein the confidence function varies with distance from the predicted location as one of: (i) a linear function; (ii) a hyperbolic function; and (iii) an exponential function.

9. The system of claim 6, further comprising a collision-avoidance system that determines a route for the vehicle that avoids the object based on the track of the object and drives the vehicle along the determined route.

10. The system of claim 6, wherein the processor predicts the location of the object at the selected time using a previous state of the object.

11. A vehicle, comprising:
a radar system for obtaining measured locations of an object in an environment of the vehicle at a plurality of times; and
a processor configured to:
determine predicted locations of an object in an environment of the vehicle at the plurality of times;
obtain a time evolution of a confidence level for the predicted locations, the confidence level at a selected time being determined from a distance between the predicted location of the object in an environment of the vehicle at the selected time and the measured location of the object at the selected time;
activate a track of the object at a time at which the confidence level rises above an activation threshold,
send the activated track to a collision-avoidance system; and
control the vehicle using the collision-avoidance system to avoid the object based on the track,
wherein the processor determines the confidence level by defining a region around the predicted location, defining a confidence function as a function of distance in the region and determining the confidence level corresponding to the determined distance as indicated by the confidence function, the confidence function being at a maximum at the predicted location and falling to zero at a boundary of the region.

12. The vehicle of claim 11, further comprising a collision-avoidance system that determines a route for the vehicle that avoids of the object based on the track of the object and drives the vehicle along the determined route.

13. The vehicle of claim 11, wherein the processor predicts the location of the object based on a previous state of the object.

14. The vehicle of claim 11, wherein the confidence function decreases with distance from the predicted location by one of: (i) a linear function; (ii) a hyperbolic function; and (iii) an exponential function.

15. The vehicle of claim 11, wherein the processor deactivates the track of the object when the confidence level falls below a deactivation threshold.

* * * * *